Feb. 10, 1925.  
F. K. FITZHERBERT  
TENNIS NET AND CHAMBERED STANDARD THEREFOR  
Filed Aug. 9, 1922   2 Sheets-Sheet 1
1,526,126
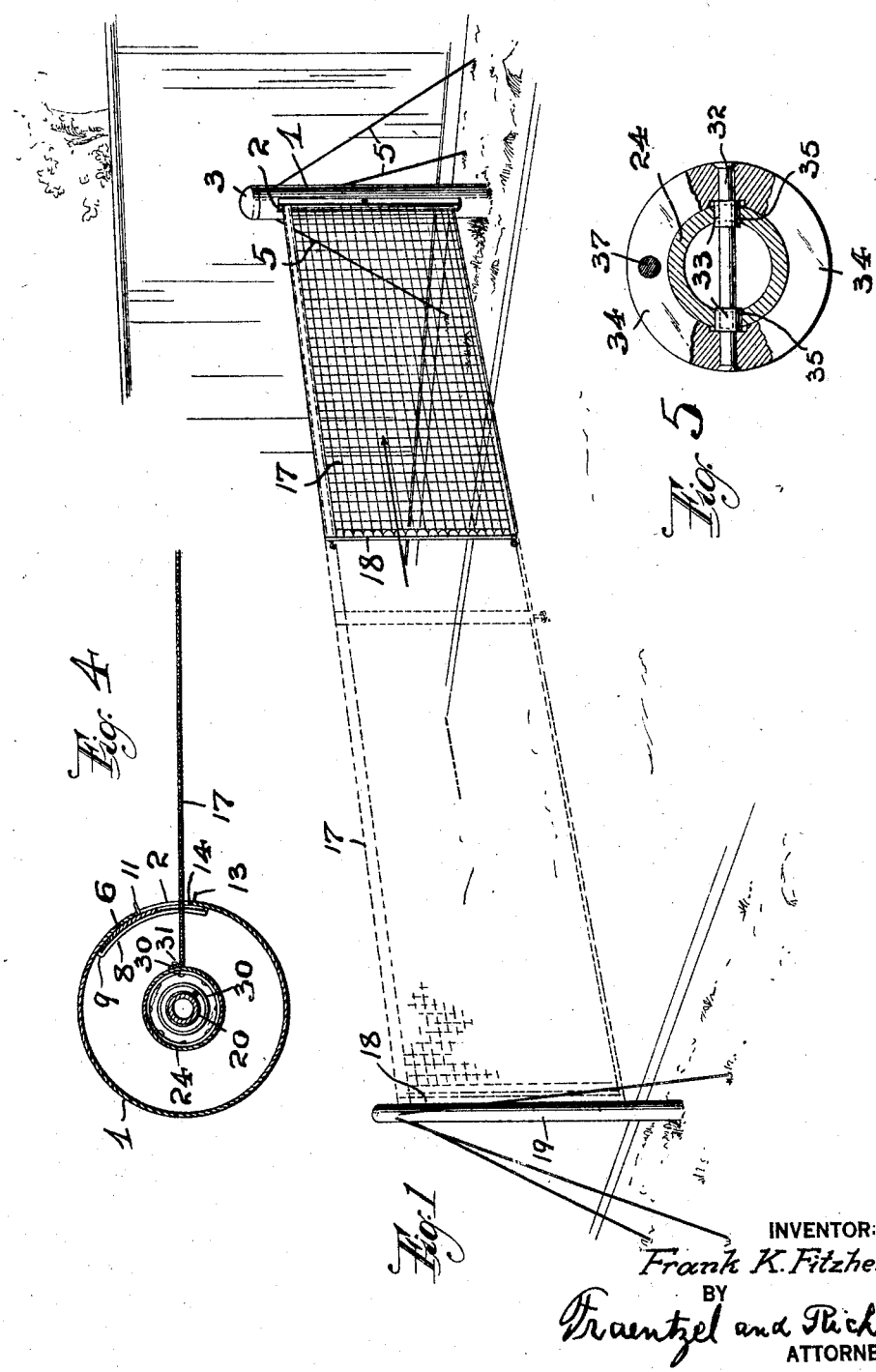
INVENTOR:
Frank K. Fitzherbert,
BY
Fraentzel and Richards
ATTORNEYS Feb. 10, 1925.
1,526,126
F. K. FITZHERBERT
TENNIS NET AND CHAMBERED STANDARD THEREFOR
Filed Aug. 9, 1922     2 Sheets-Sheet 2
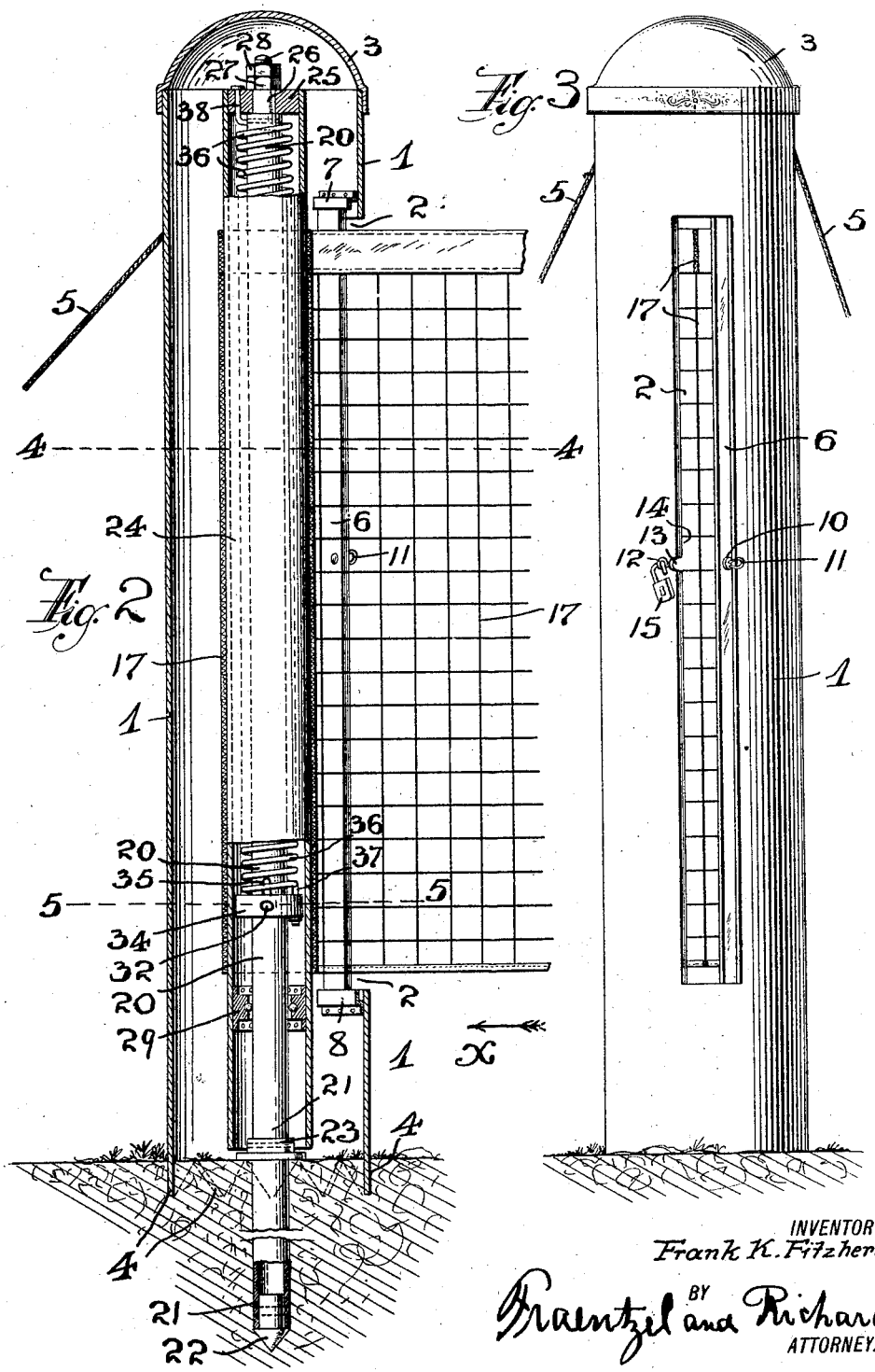
INVENTOR:
Frank K. Fitzherbert.
BY
Fraentzel and Richards,
ATTORNEYS Patented Feb. 10, 1925.

1,526,126

UNITED STATES PATENT OFFICE.

FRANK K. FITZHERBERT, OF NEWARK, NEW JERSEY.

TENNIS NET AND CHAMBERED STANDARD THEREFOR.

Application filed August 9, 1922. Serial No. 580,632.

*To all whom it may concern:*

Be it known that I, FRANK K. FITZ-HERBERT, a citizen of the United States, residing at Newark, in the county of Essex and State of New Jersey, have invented certain new and useful Improvements in Tennis Nets and Chambered Standards Therefor; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in lawn tennis nets; and, the present invention has reference, more particularly, to a novel means of support upon the one end-portion of a lawn-tennis net, said means of support being in the form of a casing provided with a spring-roller for reception upon said roller and the storing of the net in its rolled condition upon said roller and within said casing, when not in use, and against deterioration due to inclement weather conditions.

The present invention, therefore, has for its principal object to provide in connection with a lawn tennis set, an end-standard or post, adapted to be placed and secured in the ground, said standard or post being made in the form of a protecting casing, provided with means upon which the net can be rolled when not in use, and unreeled therefrom, so as to be placed for playing upon the tennis court.

The invention has for its further object to provide a novel and simply constructed, as well as an automatically operating means for reeling a lawn tennis means thereon, and for unreeling the net therefrom, and for storing the net in its rolled up position upon the tennis court, against inclement weather conditions, and against theft, when the net is not in use.

Other objects of the present invention not at this time more particularly enumerated will be clearly understood from the following detailed description of the present invention.

With the various objects of the present invention in view, the said invention consists, essentially, in the novel standard or post in the form of a casing for use with a lawn tennis net, provided with means in said casing, upon which the net is adapted to be reeled, when not in use, or can be unreeled therefrom for positioning upon the tennis court, when the tennis net is to be used by the players.

The said invention consists, furthermore, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is clearly illustrated in the accompanying drawings, in which:—

Figure 1 is a perspective view of a lawn tennis net and a chambered post or standard in the form of a protecting casing, with the net being shown in its partially unreeled relation to said post or standard, the various devices and parts shown representing one embodiment of the principles of the present invention.

Figure 2 is a transverse vertical sectional representation of the said chambered post or standard, with the working elements within said post or standard being represented partly in elevation, and partly in vertical section, said view being made on an enlarged scale; and Figure 3 is an elevation of the devices and parts represented in said Figure 2, looking in the direction of the arrow $x$ in said Figure 2.

Figure 4 is a horizontal sectional representation taken on line 4—4 in said Figure 2; and Figure 5 is a detail horizontal sectional representation, taken on line 5—5 in Figure 2, with some of the parts of the device omitted from said view, and said view being made on a still larger scale.

Similar characters of reference are employed in all of the said above described views, to indicate corresponding parts.

Referring now to the said figures of the drawings, the reference-character 1 indicates a tubular or chambered member, of suitable cross-section and height, said member being provided in its side with a suitably formed elongated opening, as 2. The upper open end-portion of said member 1 is closed by means of a suitably formed water-deflecting cap, dome, or hood, as 3, and its lower open end-portion is preferably provided with marginally disposed and preferably V-shaped spurs 4 which may be driven into the ground, substantially as indicated in Figure 2 of the drawings. It will be understood, however, that these spurs may be variously shaped. To positively secure the said member 1 in its vertical position at the side of the tennis court, guy-ropes or wires, as 5, may be provided, as indicated in Figures 1, 2 and 3 of the drawings.

As indicated in the several figures of the drawings, the herein-above mentioned opening 2 may be closed by a gate or door, as 6, slidably disposed upon the inner surface of the said member 1, at the top and bottom between ways or guides 7 and 8, each way or guide, as will be seen from an inspection of Figure 4 of the drawings, being made with a stop, as 9, which limits the opening movement of the gate or door 6, as will be evident, and the said gate or door being provided at its opposite edge with an angularly disposed projection or lug, as 10, which serves as a fingerpiece for sliding the gate or door in directions back and forth, and as will be seen from an inspection of Figures 3 and 4 serves as a stop to limit the closing motion of the said door or gate. Extending from said projection or lug 10 is an eye or loop 11, which, when the gate or door is closed, is moved against another eye or loop 12 extending from a lug or projection 13 at the marginal boundary 14 of the opening 2, said eyes or loops 11 and 12 serving to receive the hasp 16 of a lock 15, for locking the said gate or door in its closing position over the opening 2 as will be evident.

Within the said vertical post or standard thus provided is disposed a means to which one end of a lawn tennis net 17 is adapted to be secured, the net being adapted to be automatically rolled up within the said chambered standard, and being also adapted to be unreeled from said means, by being withdrawn through the opening 2 of the member 1, so as to be stretched across the tennis court, and attached at its other end-portion, by means of a rod or bar 18, in any usual manner to the usual post or standard, as 19, located upon the opposite side of the court, and as will be clearly evident from an inspection of Figure 1 of the drawings, the said bar or rod 18 thus also serving as a means for unreeling the net.

The said means consists, essentially, of a vertical stem or post 20 which is centrally disposed within the member 1, and is of such length that its lower end-portion 21 projects from the lower open end of the said member 1. This stem or post 20 is usually a piece of piping, the lower projecting end-portion of which is provided with a pointed driving plug or shoe, as 22, for driving and securely mounting the said stem or post 20 in a non-rotative position at the side of the tennis court. If desired, the said stem or post 20 may have suitably mounted thereon, in the proper location, a suitably flanged sleeve or collar, as 23, for properly positioning the said stem or post and for limiting the driving capacity of the same, as will be fully understood from an inspection of Figure 2 of the drawings.

Concentric with the said stem or post 20 is a tubular roller-element 24, the upper end of which is closed by means of a suitably formed bearing-plate or disc 25, which is centrally perforated for rotatably mounting the said plate or disc upon a reduced end-member 26 of the said stem or post 20. To guard against displacement of the said plate or disc 25 from said end-member 26, the latter is provided with screw-threads for the reception of a pair of lock-nuts, as 27 and 28. Within the lower portion of the said roller-element 24 is a suitably constructed roller or ball-bearing, as 29, which is rotatably mounted upon the correspondingly located portion of the said stem or post 20, as will be clearly understood from an inspection of said Figure 2 of the drawings. The previously mentioned tennis net 17 has its other end-portion 30 suitably secured to the tubular roller-element 24 by means of rivets or screws, as 31, as indicated in Figure 4 of the drawings, although I am fully aware that this end-portion of the net may be otherwise secured upon said roller-element.

Referring now to Figures 2 and 5 of the drawings, it will be seen that there is mounted upon the said fixed stem or post 20, at a point above the said roller or ball-bearing 29, by means of a laterally extending pin or rivet 32 a suitable collar 34. The said pin may also be provided with suitable sleeves 33 which are slidably disposed in longitudinally extending slots 35 located in the opposite sides of the previously mentioned stem or post 20, the purpose of the said slots being to permit the said collar 34 to slide upon the said stem or post 20, and to allow for the proper expansion of the coils of an actuating spring 36 which encircles that portion of the stem or post 20 between the collar 34 and the bearing-plate or disc 25, the said spring having its one free end-portion 37 secured to said collar 34, and having its other free end-portion 38 secured to the said bearing-plate or disc 25 in any suitable manner.

The operations of stretching the tennis net across the tennis court for use, and the returning of the said net in its rolled up condition within the chambered post or standard thus provided will be readily understood from the foregoing description of the present invention, and from an inspection of the several figures of the drawings, and any further description of the same is therefore deemed unnecessary, suffice it to say, however, that when the net is being unreeled for the purpose of stretching it across the court, the coils of the spring become sufficiently tightened so as to cause a proper pull upon the net to hold it in its taut relation between the standards located at the opposite sides of the tennis court.

Furthermore, it will be evident, that when the tennis net is detached from the post or standard 18, the tightened coils of the spring tend to assume their normal inactive positions, whereby the roller-element is sufficiently revolved, so that the net will be maintained in its rolled-up condition within the chambered post or standard, as will be clearly evident.

Of course, I am fully aware that changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as illustrated in the accompanying drawings,

I claim:—

1. In combination with a tennis net, a standard comprising a main chambered member, provided at one end with a water-deflecting closure, means at the other end of said member for driving and vertically mounting said standard in position in the ground, and means within said standard for rolling said net within said standard.

2. In combination with a tennis net, a standard comprising a main chambered member, provided at one end with a water-deflecting closure, means at the other end of said member for driving and vertically mounting said standard in position in the ground, and a spring-controlled means within said standard for rolling said net within said standard.

3. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, and means within said casing for rolling said net within the same.

4. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, and a spring-controlled means within said casing for rolling said net within the same.

5. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a lock for locking said gate in its closed relation to said casing, and means within said casing for rolling said net within the same.

6. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a lock for locking said gate in its closed relation to said casing, and a spring-controlled means within said casing for rolling said net within the same.

7. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, and a tubular roller rotatably mounted upon said stem for rolling said net upon said roller.

8. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, and a spring-controlled tubular roller rotatably mounted upon said stem for rolling said net upon said roller.

9. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a fixed stem within said casing, and a tubular roller rotatably mounted upon said stem for rolling said net upon said rollor.

10. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a fixed stem within said casing, and spring-controlled tubular roller rotatably mounted upon said stem for rolling said net upon said roller.

11. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, a tubular roller within said casing, a bearing-disc mounted upon said stem to which one end of said roller is secured, and a roller-bearing secured within said roller and rotatably mounted upon said stem, all arranged for rolling said net upon said roller.

12. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, a spring-controlled tubular roller within said casing, a bearing-disc mounted upon said stem to which one end of said roller is secured, and a roller-bearing secured within said roller and rotatably mounted upon said stem, all arranged for rolling said net upon said roller.

13. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a fixed stem within said casing, a tubular roller within said casing, a bearing-disc mounted upon said stem to which one end of said roller is secured, and a roller-bearing secured within said roller and rotatably mounted upon said stem, all arranged for rolling said net upon said roller.

14. In combination with a tennis net, a standard comprising a main chambered casing provided with a longitudinally extending opening, said casing being provided at one end with a water-deflecting closure, means at the other end of said casing for driving and vertically mounting said standard in the ground, a gate for opening and closing said opening, a fixed stem within said casing, a spring-controlled tubular roller within said casing, a bearing-disc mounted upon said stem to which one end of said roller is secured, and a roller-bearing secured within said roller and rotatably mounted upon said stem, all arranged for rolling said net upon said roller.

15. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, a tubular roller within said casing, a bearing-disc mounted upon said stem to which one end of said roller is secured, a roller-bearing secured within said roller and rotatably mounted upon said stem, a collar mounted upon said stem, and a spring encircling said stem, said spring being secured at one end to said collar and at its other end to said bearing disc, all arranged for rolling said net upon said roller.

16. In combination with a tennis net, a standard comprising a main chambered casing provided with a longitudinally extending opening, said casing being provided at one end with a water-deflecting closure, means at the other end of said casing for driving and vertically mounting said standard in the ground, a fixed stem within said casing, a tubular roller within said casing, a bearing-disc mounted upon said stem to which one end of said roller is secured, a roller-bearing secured within said roller and rotatably mounted upon said stem, a collar slidably mounted upon said stem, and a spring encircling said stem, said spring being secured at one end to said collar and at its other end to said bearing-disc, all arranged for rolling said net upon said roller.

In testimony, that I claim the invention set forth above I have hereunto set my hand this 4th day of August, 1922.

FRANK K. FITZHERBERT.

Witnesses:
 FREDK. C. FRAENTZEL,
 EVA E. DESCH.